(12) United States Patent
Abbestam et al.

(10) Patent No.: US 7,513,357 B2
(45) Date of Patent: Apr. 7, 2009

(54) WORK MODULE FOR CONNECTION TO A MAIN CONVEYOR LINE IN A SYSTEM OF CONVEYOR LINES AND A CONVEYOR UNIT COMPRISING AN ENDLESS CHAIN

(75) Inventors: Göran Abbestam, Partille (SE); Tommy Karlsson, Singapore (SG)

(73) Assignee: FlexLink Components AB (SE)

( * ) Notice: Subject to any disclaimer, the term of this patent is extended or adjusted under 35 U.S.C. 154(b) by 0 days.

(21) Appl. No.: 10/485,375

(22) PCT Filed: Aug. 5, 2002

(86) PCT No.: PCT/SE02/01427

§ 371 (c)(1),
(2), (4) Date: Jul. 26, 2004

(87) PCT Pub. No.: WO03/026989

PCT Pub. Date: Apr. 3, 2003

(65) Prior Publication Data

US 2004/0238323 A1 Dec. 2, 2004

(30) Foreign Application Priority Data

Aug. 3, 2001 (SE) .................................... 0102674
Aug. 13, 2001 (SE) .................................... 0102730

(51) Int. Cl.
*B65G 37/00* (2006.01)
*B65G 17/00* (2006.01)

(52) U.S. Cl. .................. 198/457.03; 198/570; 198/602; 198/841

(58) Field of Classification Search ................. 198/570, 198/602, 457.03, 841

See application file for complete search history.

(56) References Cited

U.S. PATENT DOCUMENTS

| | | | | |
|---|---|---|---|---|
| 4,662,514 A | * | 5/1987 | Berbeco | 206/718 |
| 4,872,910 A | * | 10/1989 | Eshleman et al. | 106/3 |
| 4,981,891 A | * | 1/1991 | Felter et al. | 524/247 |

(Continued)

FOREIGN PATENT DOCUMENTS

EP 0 434 011 A1 6/1991

(Continued)

OTHER PUBLICATIONS

IEEE Guide on Electrostatic Discharge (ESD): "ESD Withstand Capability Evaluation Methods (for Electronic Equipment Subassemblies)", IEEE Std. C62.39, 1994.

*Primary Examiner*—Gene Crawford
*Assistant Examiner*—Leslie Nicholson, III
(74) *Attorney, Agent, or Firm*—Lerner, David, Littenberg, Krumholz & Mentlik, LLP

(57) ABSTRACT

A work module for connection to a main conveyor line in a conveyor system, in which the work module comprises a first transverse conveyor line, a longitudinal conveyor line and a second transverse conveyor line. The first transverse conveyor line is arranged to transport goods delivered from the main conveyor line to a longitudinal conveyor line in the module. The second transverse conveyor line is arranged to transport goods delivered from the longitudinal conveyor line to the main conveyor line. Further, each of the first transverse, longitudinal and second transverse conveyor lines in the work module comprises an outer conveyor line and an inner conveyor line.

2 Claims, 4 Drawing Sheets

U.S. PATENT DOCUMENTS

| | | | |
|---|---|---|---|
| 5,205,026 A | | 4/1993 | Sticht |
| 5,355,579 A | * | 10/1994 | Miyasaka et al. .............. 29/712 |
| 5,593,019 A | * | 1/1997 | Schlagel ..................... 198/721 |
| 5,692,597 A | * | 12/1997 | Ferguson .................... 198/841 |
| 5,884,746 A | | 3/1999 | Leisner et al. |
| 5,922,440 A | * | 7/1999 | Schlueter et al. ......... 428/195.1 |
| 5,924,550 A | * | 7/1999 | Karpinsky .................. 198/831 |
| 5,947,259 A | | 9/1999 | Leisner et al. |
| 6,105,242 A | * | 8/2000 | Miyasaka et al. .............. 29/784 |
| 6,140,405 A | * | 10/2000 | Eckstein et al. ............. 524/419 |
| 6,201,945 B1 | * | 3/2001 | Schlueter et al. ............. 399/329 |
| 6,609,607 B2 | * | 8/2003 | Woltjer et al. .......... 198/457.03 |
| 2003/0107195 A1 | * | 6/2003 | Zambanini et al. ....... 280/47.34 |

FOREIGN PATENT DOCUMENTS

| | | |
|---|---|---|
| JP | 4218563 | 8/1992 |
| JP | 9052608 | 2/1997 |
| JP | 2002526582 | 3/2000 |
| JP | 2001088811 | 4/2001 |
| WO | 00/17262 | 3/2000 |
| WO | WO-02/02440 A1 | 1/2002 |

* cited by examiner

US 7,513,357 B2

WORK MODULE FOR CONNECTION TO A MAIN CONVEYOR LINE IN A SYSTEM OF CONVEYOR LINES AND A CONVEYOR UNIT COMPRISING AN ENDLESS CHAIN

TECHNICAL FIELD

The present invention relates to a work module for connection to a main conveyor line in a system of conveyor lines. The present invention also relates to a conveyor or transport unit comprising a stand which supports an endless chain or belt, which is carried on a slide bar.

BACKGROUND ART

Within the manufacturing industry, pallet based work methods are common. In these cases, mounting and/or processing take place at a number of work stations along a process flow. Since mounting and/or processing take place with a stationary product the possibility to supply a number of work stations with products for processing is ensured, in spite of the fact that the products are stationary at a work station, by means of arranging independent side transport flows to a main flow, which continuously may feed products to and from said work stations, at which side transport flows products may be removed from the main flow in order to reach a work station and also be reintroduced to the main flow from the work station.

A realization of said conveyor system with a main flow and side flows consists of module based conveyor systems where an optional number of work modules, comprising a first and a second transverse conveyor line and a longitudinal conveyor line, are connected to a main conveyor line. The first transverse conveyor line is linked to the main conveyor line via a transfer station where goods or pallets may be moved from the main conveyor line to the first transverse conveyor line. The second transverse conveyor line is linked to the main conveyor line via a transfer station where goods or pallets may be moved from the second transverse conveyor line to the main conveyor line. The first and second transverse conveyor lines are connected via transfer stations to the longitudinal conveyor line. By means of its design, the work module admits transport from the main conveyor line to a work station arranged along the longitudinal conveyor line. Examples of module based conveyor systems are described in U.S. Pat. Nos. 5,947,259 and 5,884,746.

Module based conveyor systems comprising work modules according to the description above, are used in the manufacturing industry for electronic products, such as, for example, mobile phones, printed circuit cards etc., which are sensitive for too fast electric discharges and induced electric currents Such products are usually called electrostatic discharge sensitive or ESDS. A deeper description of the problem with electrostatic discharges is for example provided in C62.38-1994 IEEE, "Guide to Electrostatic Discharge (ESD)" or via www.esda.org.

Induced electric currents may occur at the electronic product when the electronic product is transported past a charged object. A too fast discharge may take place If the electronic product gets into touch with a conducting material which is connected to ground. Said discharges or induced electric charges may thus damage the electronic product. In order to reduce these problems, dissipative materials are used. For definition of dissipative materials, it is referred to Swedish Standard SS-EN-61340-5. Examples of dissipative materials are provided in EP 434 011 on page 2 and forward, and in U.S. Pat. No. 6,140,405 below "Background Art".

A dissipative material sees to that a discharge of an electrically charged object takes place slowly. This means that the magnitude of the current at the discharge is limited, thus preventing damage on electronic products when contacting the dissipative material. It is further seen to that the electronic products are discharged by means of contact with a dissipative material. When only electrically insulating materials are used, there is a risk that an induced current arises at the electronic product if it is transported through an electric field generated by an object placed along any of the conveyor lines where the electronic product is travelling. The dissipative material also sees to that other objects, except the electronic products, which are placed on the dissipative material are discharged.

According to previously known technology, dissipative materials are used at work modules solely within a limited work area situated behind the longitudinal conveyor. The electronic product that will be processed, controlled or handled in any other way, is placed on the dissipative surface, after which processing or control will take place. Since only a limited area within the work module is covered with a dissipative material, problems remain, since an operator not easily may distinguish between dissipatively protected areas and not protected areas. Further, according to previously known technology, the conveyors are not dissipatively protected, which means that possibly protected areas may not be broken through by conveyor lines. This means that there is a risk that the operator places the electronic products outside the work area with the dissipative material, on an electrically conducting material, risking the consequence of a too fast discharge of the product. Further, there is a risk that the operator places electrically charged objects, for example tools of different kinds, on an electrically insulated support in the vicinity of the work area. These objects will then not be discharged, why there is a risk that that electronic components may be damaged by the electric field that surrounds the charged object. Tools may also be electrically charged when they are placed outside the work area if the tool gets in contact with an electrically charged area. When a charged tool later is used in order to treat the electronic components, there is a large possibility that the tool damages the electronic product that shall be treated.

DISCLOSURE OF INVENTION

The object of the invention is to provide a work module for connection to a main conveyor line in a conveyor system, where the risk of placing sensitive electronic products on an electrically conductive or electrically insulating support is reduced. This object is accomplished by means of a work module for connection to a main conveyor line in a conveyor, in which the work module comprises a first transverse conveyor line, a longitudinal conveyor line and a second transverse conveyor line, where the first transverse conveyor line is arranged to transport goods delivered from the main conveyor line to the longitudinal conveyor line, and the second transverse conveyor line is arranged to transport goods delivered from the longitudinal conveyor line to the main conveyor line, characterized in that the conveyor lines that are a part of the work module are equipped with a dissipative protection layer between the conveyor line and an underlying electrically conductive structure which supports the conveyor line.

As the conveyor lines that are a part of said work module are equipped with a dissipatively conducting protection layer between the conveyor line and an underlying electrically conductive structure which supports the conveyor line, the creation of work modules with large protected areas which include the conveyor lines is made possible. The presence of large protected areas reduces the risk of misplacing goods on a conductive support with a too fast discharge as result or, alternatively, misplacing on an electrically insulating support with no discharge as result. Further, by using large protected areas, the risk of misplacing the tool outside a dissipative work surface arranged on the work module is reduced, thus reducing the risk of the tool getting into contact with an area with a potential separate from the intended.

Further, by means of the invention, it is seen to that transported goods automatically gets into contact with a dissipatively conducting protected area since the transport line is in contact with an electrically conductive structure via a dissipative material. By arranging transported electronic components on pallets, which offer electrical contact with the support, it is seen to that discharge of possibly present electric charge of the components takes place in a controlled manner in the work module.

In a preferred embodiment of the invention, the work module is formed with an upper surface, comprising an area which is limited by the outer conveyor lines of the first and the second transverse conveyor line and the longitudinal conveyor line, where a dissipatively conducting protective layer essentially covers said area. Essentially covering here refers to that at least 95% of the points which are possible to reach with a ball with a diameter of 1 cm are equipped with a dissipative protective layer placed between said points and an underlying electrically conductive structure. The demand for being able to be reached by a ball with a diameter of 1 cm causes that that parts of the upper surface which only are possible to reach with a very thin probe do not have to be dissipatively protected. For example, parts of the electrically conductive structure would probably be able to reach with a very thin probe at the conveyor belts. By means of the definition it is seen to that the upper surface essentially is covered with a dissipatively conducting protective layer for practical purposes.

By means of the preferred embodiment, a possibility is admitted to achieve a dissipatively conducting protective layer for the whole work module except a minority of points within said area which preferably are formed with a higher surface resistivity than the dissipatively conducting layer, thus reducing the risk of misplacing goods with too fast discharging or no discharging, respectively, as the consequence. By allowing that 5% of the points are not covered with a dissipatively conducting protective layer, a possibility is admitted to create work surfaces which support, by way of example, electrical switches, lead-throughs for wires or sensors without these objects having to be dissipatively protected. It is of course desirable that all points are dissipatively conducting protected.

A second object of the invention to provide a dissipatively conducting protected conveyor unit. Conveyor unit here refers to a stand, which supports an endless chain or belt carried on a slide bar. This object is accomplished by means of a conveyor unit according to the characterizing part of claim 14.

BRIEF DESCRIPTION OF DRAWINGS

The invention will be described more in detail below with reference to the appended drawings, where.

MODES FOR CARRYING OUT THE INVENTION

Figure 1:
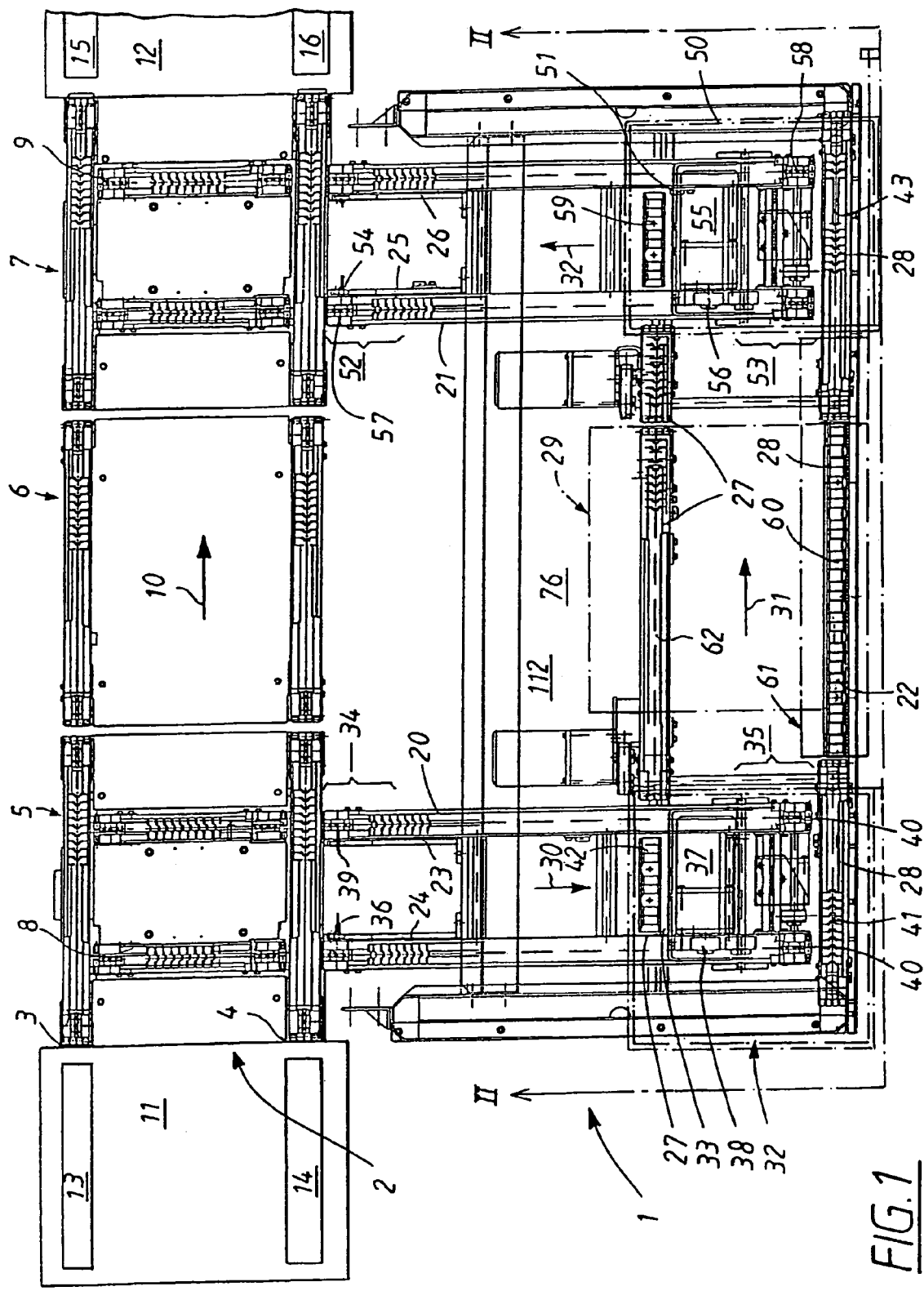
FIG. 1 shows a work module in a top plane view.

In FIG. 1, a conveyor system is shown comprising a work module 1 and a main conveyor line 2. The main conveyor line 2 consists of two parallel main conveyor lines 3, 4 of which each one is formed as one or more endless belts or chains. In the embodiment shown, the main conveyor line 2 is made in three units, where a first and a second unit 5, 7 are equipped with each transfer station 8, 9 and also an Intermediate unit 6 without transfer station. In the embodiment shown, the transfer stations 8, 9 consist of transverse endless conveyor lines which are arranged in a parallel manner and designed to be vertically adjustable in a direction vertical to a plane through the upper surfaces of the main conveyor lines 3, 4. In their raised position, the transfer stations are capable of transporting goods from and to the work module, respectively, while in their lowered position transport of goods along the main conveyor lines 3, 4 is enabled without coming into contact with the transfer stations 8, 9. In an alternative embodiment, it is of course conceivable to design the two parallel conveyor lines of the main conveyor line to be vertically adjustable instead. The two parallel conveyor lines 3, 4 of the main conveyor line are preferably formed for transporting goods in a predetermined direction, which is indicated with the arrow 10. For re-transporting goods, another lower conveyor line (not shown) is thus preferably arranged, which transports goods in the opposite direction. The lower conveyor line is, in contrast to the main conveyor lines 3, 4, preferably designed as one single return conveyor fine comprising two parallel conveyor lines of which each one is made as one or more endless belts or chains. For transferring goods between the main conveyor line and the lower conveyor line, there are lifts 11, 12 which are arranged at each end of the main conveyor line 2. Each one of the lifts 11, 12 comprises conveyor lines 13-16 which are reversible for transport both in the direction in to the elevator and out from the elevator.

The work module 1 comprises a first transverse conveyor line 20, a second transverse conveyor line 21 and a longitudinal conveyor line 22. Conveyor line here refers to the means which executes the physical transport of the object which is placed on the conveyor line. These may for example consist of endless belts or chains or rotatable cylinders journalled in bearings. Transverse here refers to that the conveyor line has a transport direction which forms an angle with the transport direction of the main conveyor line. Preferably the transverse conveyor line is arranged to be perpendicular in relation to the main conveyor line. Longitudinal here refers to that the conveyor line has a transport direction which mainly is parallel to the transport direction of the main conveyor line. In the embodiment shown, the first transverse conveyor line 20 consists of two parallel conveyor lines, an inner line 23 and an outer line 24. Outer line here refers to that the line lies closer to the edge of the work module than the inner line. According to a preferred embodiment, the inner and outer line are each formed as an endless conveyor line which are made with the same lengths. In the same way, the second transverse conveyor line 21 consists of two parallel conveyor lines, an inner line 25 and an outer line 26. Further, the longitudinal conveyor line 22 consists of two parallel conveyor lines, an inner line 27 and an outer line 28. The first transverse conveyor line 20 is designed to mainly transport goods from the main conveyor line 2 to a work station 29 situated along the longitudinal conveyor line 22, while the other transverse conveyor line 21 is designed to mainly transport goods from the work station 29 to the main conveyor line 2. The longitudinal conveyor line 22 is designed to transport goods from the first transverse conveyor line 20 to the second transverse conveyor line 21 via the work station 29. However, the conveyor lines may, of course, be designed to admit transport in both directions. The arrows 30, 31 and 32 indicate the flow direction for the goods according to the preferred embodiment.

In order to admit transfer of goods from the first transverse conveyor line 20 to the longitudinal conveyor line 22, a first transfer station 32 is arranged at a transfer area 33. The transfer area 33 is situated where the first transverse conveyor line 20 intersects the longitudinal conveyor line 22. The first transfer station 32 admits transfer of goods from the first transverse conveyor line 20 to the longitudinal conveyor line 22 as the first transverse conveyor line 20 is arranged to take a first raised position when transport with the first transverse conveyor line 20 to said transfer area 33 is admitted without collision with the longitudinal conveyor line 22 and a second lowered position where transport from said transfer area 33 with the longitudinal conveyor line 22 is admitted.

According to a preferred embodiment, the first transverse conveyor line 20 is designed with a first end 34 which is intended to be placed close by said main conveyor line 2 without extending into the main conveyor line and a second end 35 which extends into the transfer area 33.

According to a further preferred embodiment, the first end 34 is pivotally arranged around a pivot axis 36 whereby the other end 36 is arranged to be vertically adjustable as the first transverse conveyor line 20 is rotated about its pivot axis 36. According to a preferred embodiment, the rotation is achieved by means of a driving motor 37 that rotates an eccentrically arranged cam disk 38 on which a frame structure (not shown) for the first transverse conveyor line 20 rests.

Moving of goods between the main conveyor line 2 and each one of the transverse conveyor lines 20, 21 takes place via the transfer station 8, 9 mentioned above. These transfer stations preferably consists of vertically adjustable endless conveyor lines situated between the two parallel conveyor lines 3, 4 of the main conveyor line. The conveyor lines of the main conveyor line are thus uninterrupted at the transfer station. When moving goods from the main conveyor line 2 to the first transverse conveyor line 20, goods is moved over that conveyor line 4 of the main conveyor 2 which faces the work module 1. The goods is then received by the first end 34 of the first transverse conveyor line.

According to a further preferred embodiment, the first transverse conveyor line 20 comprises two endless conveyor lines 23, 24 which are arranged in a parallel manner, where the endless conveyor lines are bent around a centre point at said first end 34 of said first transverse conveyor line 20. According to this embodiment, the pivot axis 36 runs through the centre point, thus admitting rotation around the pivot axis without changing the vertical position for the transverse conveyor line at the transition between main conveyor line and transverse conveyor line. The endless conveyor lines 23, 24 each consists of an endless chain which, at respective end of the transverse conveyor line, is supported by a cogwheel or a carriage wheel 40. The pivot axis 36 is common with a centre axis which supports the cog-wheels or carriage wheels 39 at the first end 34.

In a preferred embodiment, the cog-wheels or carriage wheels 39 at the first end 34 are freely journalled in bearings.

The second end 35 of the first transverse conveyor line 20 is situated in connection with, but inside, the outer conveyor line 28 of the longitudinal conveyor line 22, which consists of a driven endless conveyor line 41 in the transfer area 33. According to a preferred embodiment, within said transfer area, the inner conveyor line 27 of the longitudinal conveyor line consists of a passive unit 42 situated between the inner and outer conveyor lines 23, 24 of the first transverse conveyor line. Passive unit here refers to a part of a conveyor line that is not driven. When a conveyor line is formed of two parallel lines, it is possible to make one of these lines as a passive unit. The other line that is arranged to be parallel sees to that goods is moved along the line. Passive units should not be too long, as transported goods may be rotated as a consequence of that the goods is not symmetrically driven The passive unit 42 preferably consists of a set of cylinders which are not driven, journalled in bearings.

In order to admit movement of goods from the longitudinal conveyor line 22 to the second transverse conveyor line 21, a second transfer station 50 is arranged in a transfer area 51 where the second transverse conveyor line 21 intersects the longitudinal conveyor line 22. The second transfer station 50 admits transfer of goods from the longitudinal conveyor line 22 to the second transverse conveyor line 21 as the second transverse conveyor line 21 is arranged to take a first raised position when transport with the second transverse conveyor line 21 out from said transfer area 51 is admitted without collision with the longitudinal conveyor line 22, and a second lowered position where transport with the longitudinal conveyor line 22 to said transfer area 51 is admitted. According to a preferred embodiment, the second transverse conveyor line 21 is designed with a first end 52 which is intended to be placed in connection with said main conveyor line 2 and a second end 53 which extends into the transfer area 51. By means of this design, the main conveyor line 2 may be formed as on single continues line comprising two parallel main conveyor lines 3, 4 of which each one is formed as an endless belt or chain without the transverse conveyor line overlapping the main conveyor line. According to a further preferred embodiment, the first end 53 is pivotally arranged around a pivot axis 54 where the other end is arranged to be vertically adjustable as the second transverse conveyor line 21 is rotated about its pivot axis 54. According to a preferred embodiment, the rotation is achieved by means of a driving motor 55 that rotates an eccentrically arranged cam disk 56 on which a frame structure (not shown) for the second transverse conveyor line 21 rests.

The second transverse conveyor line 21 comprises two endless conveyor lines 25, 26 which are arranged in a parallel manner, where the endless conveyor lines are bent around a centre point at said first end 52 of said second transverse conveyor line 21. According to this embodiment, the pivot axis 54 runs through the centre point, thus admitting rotation around the pivot axis without changing the vertical position for the transverse conveyor line at the transition between main conveyor line and transverse conveyor line. The endless conveyor lines 25, 26 each consists of an endless chain which, at respective end of the transverse conveyor line, is supported by a cog-wheel or a carriage wheel 57, 58. The pivot axis 54 is common with a centre axis which supports the cog-wheels or carriage wheels 57 at the first end 52.

In a preferred embodiment, the cog-wheels or carriage wheels 57 at the first end 52 are freely journalled in bearings.

The second end 53 of the second transverse conveyor line 21 is situated in connection with, but inside, the outer conveyor line 28 of the longitudinal conveyor line 22, which consists of a driven endless conveyor line 43 in the transfer area 51. According to a preferred embodiment, within said transfer area, the inner conveyor line 27 of the longitudinal conveyor line consists of a passive unit 59 situated between the inner and outer conveyor lines 25, 26 of the second transverse conveyor line. The passive unit 59 preferably consists of a set of cylinders which are not driven, journalled in bearings.

According to a preferred embodiment of the invention, the outer conveyor line 28 of the longitudinal conveyor line 22 is formed as a passive unit 60 in an area 61 between the inner conveyor lines 23, 25 of the first and second transverse conveyor lines 20, 21. The area extends in a direction along the longitudinal conveyor line 22 that at least comprises the extension of the work station in this direction. Preferably, the passive unit has an extension which exceeds 40 cm in said direction. The passive unit 60 is preferably made of a set of cylinders which are journalled in bearings. Within this area, the goods is transported by means of the inner conveyor line 27 of the longitudinal conveyor line 22, which within the area 29 consists of one or more driven endless lines 62.

Figure 2:
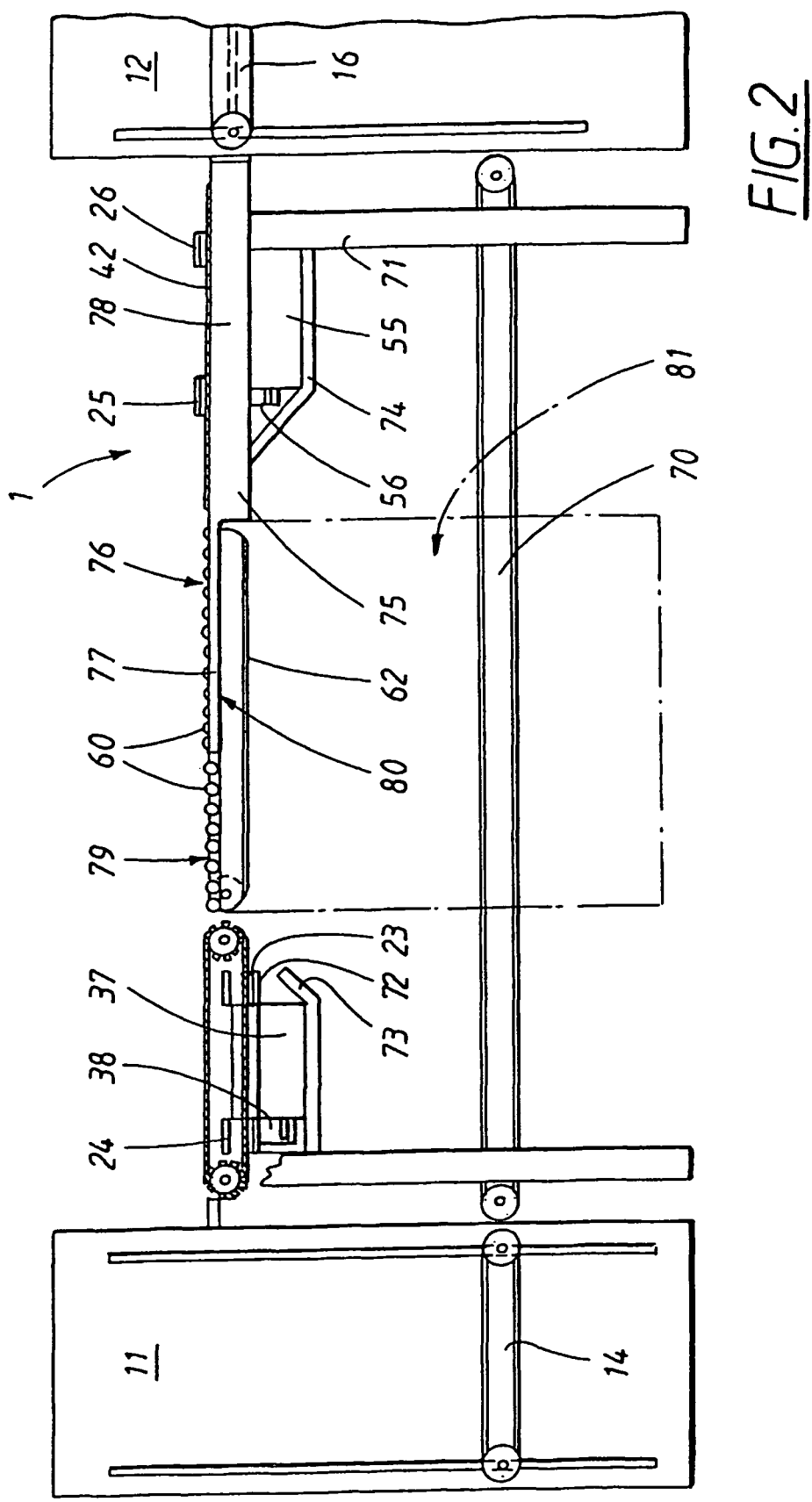
FIG. 2 shows a work module seen in a front plane view along the intersection line II-II in FIG. 1.

FIG. 2 shows the conveyor system in FIG. 1 seen in a front plane view along the cut line II-II. In the figure, the left-hand part of an edge side of the upper plane surface of the work module 76 has been cut away in order to more clear show lines which are a part of the work module. The conveyor system comprises a work module 1 arranged in connection with a main conveyor line. The conveyor system is made with a lower conveyor line 70, which is made as a single main conveyor line comprising two parallel conveyor lines of which each one is made as an endless belt or chain. For transferring goods between the upper and the lower line, there are lifts 11, 12 which are arranged at each end of the main conveyor line 2. Each one of the lifts 11, 12 comprises conveyor lines 13-16 which are reversible for transport both in the direction in to the elevator and out from the elevator. In the figure, the conveyor line 14 that belongs to the lift 11 is shown in its lower position for transfer of goods between the lower conveyor line 70 and the lift, and also the conveyor line 16 in its upper position for transfer of goods between the lift and the main conveyor line 2.

Further, a stand 71 is arranged, which supports the work module 1. On the left-hand side of the work module shown in the figure, the driven endless conveyor line 41, which constitutes the outer conveyor line 28 of the longitudinal conveyor line 22 in the transfer area 33, is shown. Further, the inner conveyor line 23 and the outer conveyor line 24 of the first transverse conveyor line 20 is shown in its lowered position. The first transverse conveyor line 20 is supported by a frame structure 72 according to what has been stated above, where the vertical adjustment of the first transverse conveyor line is achieved by means of a driving motor 37 that rotates an eccentrically arranged cam disk 38. In the embodiment example shown, the driving motor is supported by a rod 73 which is fastened to the stand 71.

On the right-hand side of the work module shown in the figure, the driven endless conveyor line 42 which constitutes the outer conveyor line 28 of the longitudinal conveyor line 22 in the transfer area 51 is shown. Further, the inner conveyor line 25 and the outer conveyor line 26 of the second transverse conveyor line 21 is shown in its raised position. The second transverse conveyor line 21 is supported by a frame structure (not shown) according to what has been stated above, where the vertical adjustment of the second transverse conveyor line is achieved by means of a driving motor 55 that rotates an eccentrically arranged cam disk 56. In the embodiment example shown, the driving motor is supported by a rod 74 which is fastened to the stand 71.

Further a driven endless line 62 is shown, which constitutes the inner conveyor line 27 of the longitudinal conveyor line 22 in the area 29. The driven endless line 62 is situated behind the passive unit 60 of the outer line 28 of the longitudinal conveyor line 22. Further, the edge side 75 of the upper plane surface 76 of the work module, which constitutes a work surface, is shown. The edge side 75 may be formed as shown in FIG. 2 with an area 77 which corresponds to the area 29 of the work station where the edge is equipped with a lesser vertical extension than at the module's left (not shown) and right part 78.

In a preferred embodiment, the work module 1 is formed with an upper surface comprising an area 112 which is limited by the outer conveyor lines 24, 26, 28 of the first and the second transverse conveyor line 20, 21 and also the longitudinal conveyor line 22. The area is further preferably limited by the rear edge of the upper surface 76, which is arranged to face the main conveyor line. When the rear edge is placed at a sufficiently large distance from the front edge, in what way an operator not accidentally may touch the rear edge, the protected area may be limited to what normally is within reach for an operator in the direction towards the main conveyor. In this case, an area surrounding the rear edge does not have to be protected. Said area is essentially covered with a dissipatively conducting protective layer.

Dissipatively conducting here refers to that the surface has a surface resistivity between $10^4$ and $10^{10}$ Ω/sq. The surface shall be measured at 23° C. and at a humidity of the air of 12% RH.

"Essentially covered" here refers to at least 95% of the points which are possible to reach with a ball with a diameter of 1 cm are equipped with a dissipatively conducting protective layer placed between said points and an underlying electrically conductive structure. According to a preferred embodiment, the dissipatively conducting protective layer of the upper surface 76 within said area (112), except at those areas where the included conveyor lines (20, 21, 22) run, consists of a plastic mat which is applied on a supporting surface. The plastic mat is electrically connected with the underlying conductive structure 71. The plastic mat may be made in an optional dissipatively conducting material, for example such that has been disclosed in EP 434 011 and U.S. Pat. No. 6,140,405 and previously known materials also disclosed there.

The underlying electrically conductive structure may consist of a stand 71 which supports the upper surface 76 and also a stand 91 (FIG. 4) which supports the lines. According to a first embodiment, the points which are not covered with a dissipatively conducting protective layer have a resistance to ground exceeding $1.0*10^8$ Ω and admit a discharge of an electrostatic charge exceeding 100 V faster than 2 s. According to an alternative embodiment, the whole upper surface is covered with a dissipatively conducting material within the area 112, except at lead-throughs in the material where conveyor lines 20, 21, 22 that are part of the work module 1 run.

In a further preferred embodiment, the whole upper surface is equipped with a dissipatively conducting protective layer placed between said points and an underlying electrically conductive structure 71, 92, 93.

According to a preferred embodiment, the resistance between the dissipatively conducting surface and the underlying structure lies within the interval $7.5*10^5$ and $1.0*10^8$ Ω.

All conveyor lines within the area 112 are equipped with a dissipatively conducting protective layer between line and ground.

In a further preferred embodiment, the endless conveyor lines 23, 24, 25, 26, 27, 41 and 42 which are a part of the module 1, are made by chains which are supported by slide bars, where the chains are made of or coated with a conductive material and said slide bars are made of or coated with a dissipatively conducting material.

Alternatively, the chains may be made of a dissipatively conducting material. Such an embodiment is not advantageous, since dissipatively conducting materials usually are expensive and the consumption of material is larger than when sliding ledges made in a dissipatively conducting material are used. For the passive units, the cylinders that are journalled in bearings which are included, are preferably coated with or made of a dissipatively conducting material. Alternatively, the cylinders may be journalled in bearings via or be suspended in a structure made of or coated with a dissipative material.

According to what has been described above, the work module 1 is supported by the stand 71 The work module is thus formed as a working place with a space for the legs 81 arranged below the work station 29 In order to provide a good work environment, it is important to minimize the distance between the upper surface 76 and the roof 80 of the space for the legs, at the front edge of the work station. According to a preferred embodiment of the invention described above, the outer conveyor line 28 of said longitudinal conveyor line 22 is for this purpose designed as a passive unit 60. As the passive unit may be made with a very small, or none at all, mounting height, if the passive unit consists of a slide line, said distance may be reduced considerably compared with the case where a driven unit is used. According to a preferred embodiment, the work module 1 has a distance between a plane 79 which touches upon the upper surface of the passive unit and the roof 80 of a space for the legs 81 below said passive unit 60 which falls below 8 cm. In a preferred embodiment said distance falls below 4 cm.

Figure 3:
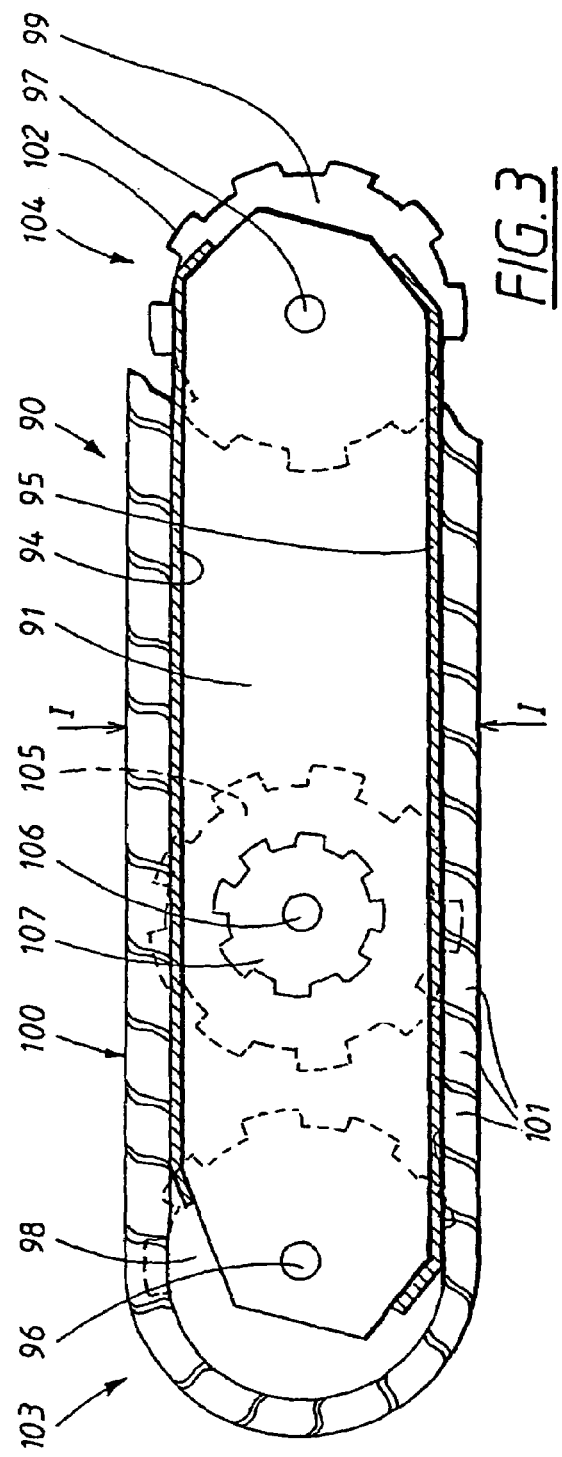
FIG. 3 shows a chain driven conveyor line in detail.

FIG. 3 shows a side view of a chain driven conveyor unit 90. A conveyor unit here refers to a unit which supports a conveyor line in the form of an endless belt or chain. The conveyor unit comprises a stand 91 which according an embodiment is made by two aluminum profiles 92, 93 (FIG. 4) which are joined together. The aluminum profiles are made in a way previously known for anyone skilled in the art and are arranged to support slide bars 94, 95 and wheel axles 96, 97 for cogwheels 98, 99 that are driven or freely journalled in bearings. Together with the slide bars 94, 95, the cogwheels or carriage wheels 98, 99 support an endless chain 100 which is joined by means of a set of links 101 which are coupled to each other in a previously known manner. The cogwheels or carriage wheels support a gear ring 102 which meshes the corresponding recesses in the chain 100.

In the example shown, the stand consists of two angled aluminium profiles 92, 93 which together form a square profile which partly supports said slide ledges 94, 95, partly supports the wheel axles 96, 97 for the cogwheels or carriage wheels 98, 99. In a preferred embodiment of the invention, at least one of the cogwheels or carriage wheels 98, 99, which are arranged in the bending areas of the chain, is freely journalled in bearings. When both the cogwheels or carriage wheels are freely journalled in bearings, at least a third cogwheel 105 is arranged, which is driven by its wheel axle 106, for example. by means of a cogwheel 107 that is mounted on the outside of the stand 91 and accessible for a drive unit.

Figure 4:
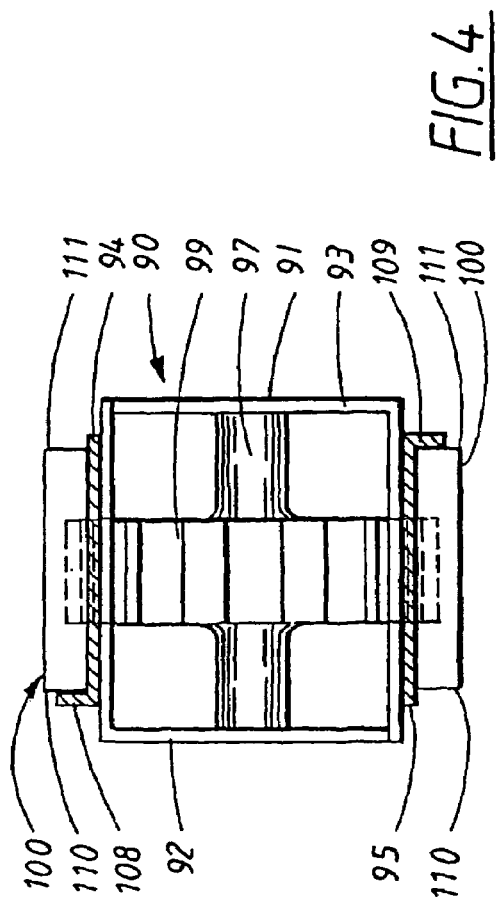
FIG. 4 shows a cross-section along the intersection line I-I in FIG. 3.

As apparent from FIG. 4, the slide ledges 94, 95 are preferably made with vertically extending protrusions 108, 109 which extend a distance past the side walls 110, 111 of the chain 100. The outgrowths 108, 109 control conveyed objects and prevent lateral movement of these.

In order to provide a sufficient protection against damage on objects from partly too fast discharges of electrostatic charge, partly damage due to electric fields originating from movements of electrostatically charged objects, the chain 100 is made of or coated with a conductive material and the slide ledge is made of or coated with a dissipatively conducting material.

Figure 5:
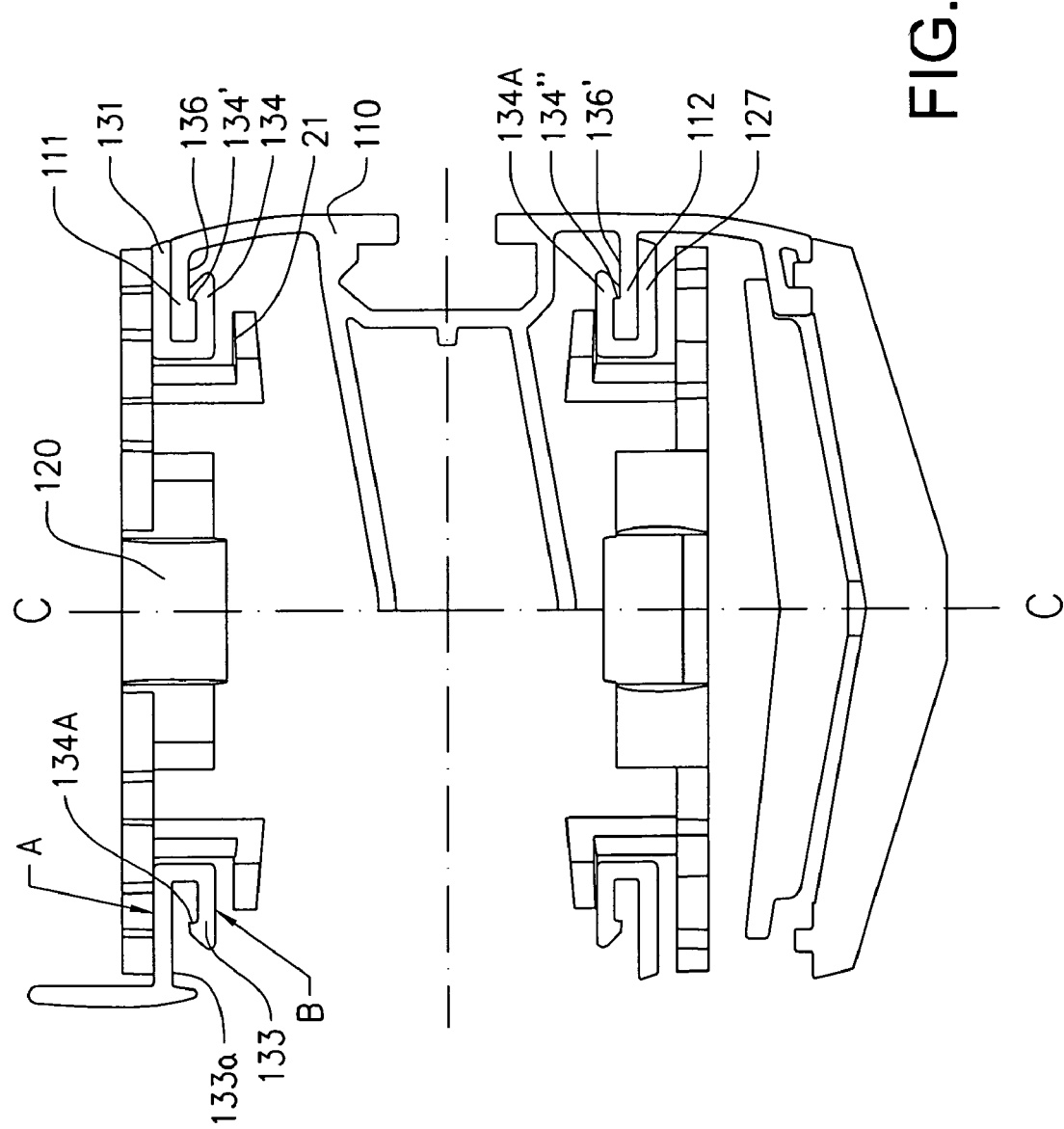
FIG. 5 shows an embodiment of a conveyor unit.

According to an embodiment of the invention which is shown in FIG. 5, the conveyor unit is made as described in the patent document SE 516849 or WO 02/02440. In this document, a slide rail arrangement for a conveyor unit is described, which has a drive device in a conveyor line driven endless conveyor chain. The conveyor chain is supported and controlled on upper and lower flanges (111, 111' (not shown), 112, 112' (not shown)) running in the beam direction, on at least one profile beam (110), which flanges are arranged from the corresponding profile sides towards the profile centre. The conveyor unit is equipped with at least one pair of deflecting devices in order to conduct the conveyor chain (120) and reverse the movement direction of the chain from a first direction to the opposite from a corresponding pair of slide rails (131; 127) on the upper flanges.

According to a preferred embodiment, each one of the slide rails has a part (A) with a essentially U-shaped cross-section extending in the direction of the slide rail. Further, one of the shanks (133, 133a) of said part has a longitudinal part (B) made in one piece, that together with said shank forms a locking lug that extends in the longitudinal direction of the slide rail. The corresponding flange (111, 111' (not shown), 112, 112' (not shown)) on the profile beam has a recess (136, 136') that extends in the longitudinal direction of the flange with a stop face (134', 134") that prevents the locking lug (134, 134A) and the slide rail (131, 127) from being displaced towards the profile beam centre plane.

The description of a conveyor unit according to the patent document SE 516849 or WO 02/02440 are completely incorporated in this application.

The inventions shall not be limited to the embodiments described above, but may vary freely within the scope of the appended claims.

The invention claimed is:

1. A work module for connection to a main conveyor line in a system of conveyor lines, said work module comprising:
   a first transverse conveyor line;
   a longitudinal conveyor line;
   a second transverse conveyor line;
   each of said conveyor lines comprising an outer conveyor line and an inner conveyor line;
   an upper surface, said upper surface having an area which is limited by said outer conveyor lines of said first transverse, second transverse and the longitudinal conveyor lines;
   a dissipatively conducting material comprising a plastic mat essentially covering said upper surface within said area except at positions within said area where said first transverse, second transverse and longitudinal conveyor lines run; and
   an underlying electrically conductive structure supporting each of said conveyor lines,
   said first transverse conveyor line being arranged to transport goods delivered from said main conveyor line to the longitudinal conveyor line,
   said second transverse conveyor line being arranged to transport goods delivered from said longitudinal conveyor line to said main conveyor line,
   in each of said first transverse, longitudinal and second transverse conveyor lines are equipped with a dissipatively conducting protection layer between said each conveyor line and said underlying electrically conductive structure, and said dissipatively conducting protection layer has a surface resistivity in the range between $10^4$ Ω/sq and $10^{10}$ Ω/sq.

2. A transport unit comprising:

a stand;

an endless chain or belt; and at least one slide bar, said stand supports said endless chain or belt which is carried on said slide bar, and supports a first and a second cogwheel or carriage wheel, which are arranged in a respective bending area of said chain or belt, said first and second cogwheels or carriage wheels are made of dissipatively conducting material, said slide bar is made of or coated with a dissipatively conducting material and said chain or belt is made of or coated with a conductive material, and said dissipatively conducting material has a surface resistivity in the range between $10^4$ Ω/sq and $10^{10}$ Ω/sq.

\* \* \* \* \*